United States Patent Office 3,338,904
Patented Aug. 29, 1967

3,338,904
ANTHRAQUINONE DYESTUFFS
Hans Altermatt, Reinach, Basel-Land, Switzerland, assignor to Ciba Limited, Basel, Switzerland, a Swiss company
No Drawing. Filed Nov. 22, 1965, Ser. No. 509,227
Claims priority, application Switzerland, Oct. 28, 1960, 12,112/60; Dec. 23, 1960, 14,396/60; Apr. 24, 1961, 4,788/61; May 4, 1961, 5,240/61
3 Claims. (Cl. 260—272)

This is a continuation in part of my application Ser. No. 147,152 filed Oct. 24, 1961.

The present invention provides new, valuable anthraquinone dyestuffs which correspond to the formula

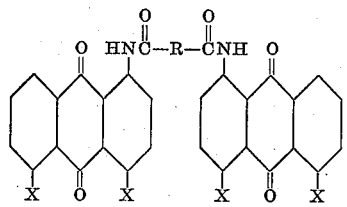

and

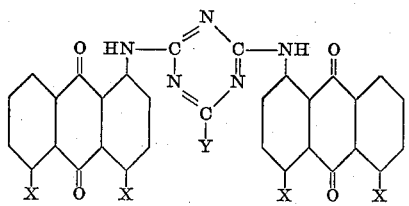

in which one X is hydrogen and the other X an at most bicyclic arylmercapto group, R is a member selected from the group consisting of phenylene, thiophene, diphenylene, azodiphenylene, diphenylmethane, naphthylene thianthrene radicals and the radical of the formula

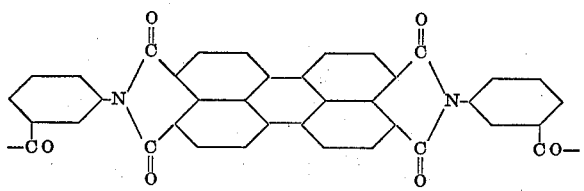

and Y is a member selected from the group consisting of a chlorine, atom, a phenylamino, phenoxy, phenylmercapto, phenyl, and β-hydroxy-naphthyl radicals.

The new dyestuffs may be obtained by condensing two mols of an aminoanthraquinone of the formula

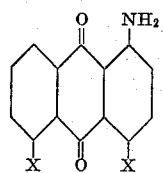

in which one X is hydrogen and the other X is an at most bicyclic arylmercapto group, for example a napthylmercapto group, but especially a phenylmercapto group which may be substituted by, chlorine atoms lower alkyl, phenyl, and lower alkoxy groups, with one mol of a halide of an appropriate dicarboxylic acid or a dihalogentriazine of the formula

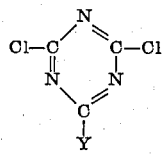

in which Y has the above indicated meaning.

The dyestuffs of the invention are suitable for dyeing and printing a very wide variety of materials such as synthetic or natural fibers, and especially for dyeing or printing textile materials of natural or regenerated cellulose from a vat. The dyeings obtained by using the dyestuffs of the invention are distinguished by their excellent fastness to light and excellent properties of wet fastness.

The condensation products obtained by the process, after conversion into a finely divided form, are suitable as pigments, for example, for dyeing organic products of high molecular weight, such as lacquers, plastic masses, for example, polyvinyl chloride, or plastic masses capable of being spun, for example, viscose, acetyl-cellulose, polyacrylonitrile, polyesters, polyamide and polyalkylenes, such as polyethylene or polypropylene, or they may be used as printing colors.

The following examples illustrate the invention, the parts and percentages being by weight unless otherwise stated, and the relationship of parts by weight to parts by volume being the same as that of the kilogram to the liter:

Example 1

16.5 parts of 1-amino-5-phenylmercapto-anthraquinone are stirred with 4.6 parts of cyanuric chloride and 0.2 part of pyridine in 150 parts by volume of dry nitrobenzene at 160° C. for 3 hours. The whole is stirred under reflux for a further hour. The bright orange condensation product separates out while the mixture is still warm. After cooling the mixture, the precipitate is filtered off, washed with a little nitrobenzene and then thoroughly washed with methanol. The dyestuff so obtained corresponds to the formula

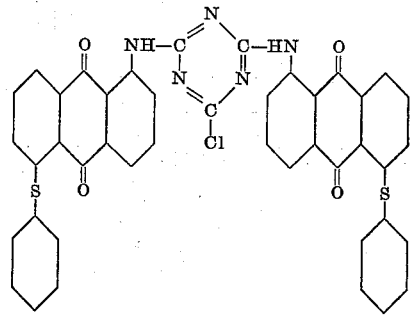

and dyes cotton golden yellow tints from a red-orange vat.

By using as the amine component, instead of 1-amino-5-phenylmercapto-anthraquinone, an equimolecular quantity of any of the amines named in Column I of the following table, there are obtained dyestuffs which dye cotton from a vat the tints given in Column II.

| | I | II |
|---|---|---|
| 1 | 1-amino-4-phenylmercaptoanthraquinone | Red. |
| 2 | 1-amino-5-p-methoxyphenylmercaptoanthraquinone | Yellow. |
| 3 | 1-amino-5-p-phenyl-phenylmercaptoanthraquinone | Do. |
| 4 | 1-amino-5-(para-methylphenylmercapto)-anthraquinone | Orange-yellow. |
| 5 | 1-amino-5-(3-chlorophenylmercapto)-anthraquinone | Yellow. |
| 6 | 1-amino-4-(1-napthylmercapto)-anthraquinone | Red. |
| 7 | 1-amino-4-(2-napthylmercapto)-anthraquinone | Red. |
| 8 | 1-amino-5-(2-napthylmercapto)-anthraquinone | Yellow. |
| 9 | 1-amino-5-(8-chloro-1-naphthylmercapto)-anthraquinone | Do. |

Example 2

3 parts of the condensation product obtained as described in the first paragraph of Example 1 are stirred under reflux for 20 hours with 2 parts of aniline and 0.2 part of pyridine in 100 parts by volume of ortho-dichlorobenzene. After cooling the mixture, it is clarified by filtration, and the yellow-orange dyestuff of the formula

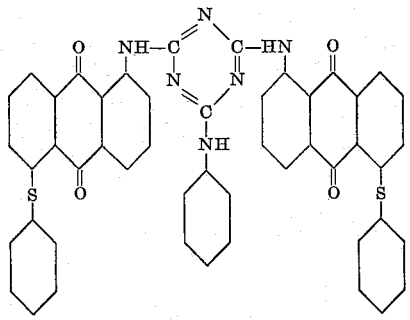

is precipitated with ether. It dyes cotton from a red-orange vat yellow tints.

Example 3

3 parts of the condensation product obtained as described in the first paragraph of Example 1 are stirred under reflux for 20 hours with 3 parts by volume of thiophenol and 0.5 part of metallic sodium in 100 parts by volume of dimethyl-formamide. After cooling the mixture, it is filtered with suction and the yellow-brown dyestuff is washed well with methanol and water. It has the formula

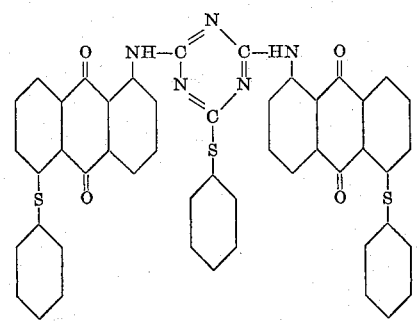

and dyes cotton yellow tints from a red-orange vat.

Example 4

66.2 parts of 1-amino-5-phenylmercapto-anthraquinone are stirred in 700 parts by volume of dry nitrobenzene in the presence of 1 part of pyridine with 22.6 parts of 2:4-dichloro-6-phenyl-1:3:5-triazine for 3 hours at 160° C., and then for a further ¼ hour under reflux. After being cooled, the orange-yellow dyestuff of the formula

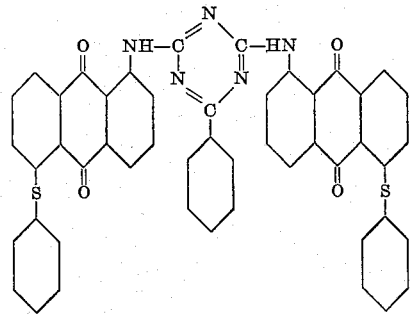

separates out, and is thoroughly washed with methanol and dried in vacuo at 70° C. The dyestuff dyes cotton from a vat yellow tints having excellent properties of fastness.

By using instead of 2,4-dichloro-6-phenyl-triazine 24.2 parts of 2,4-dichloro-6-phenoxy-1:3:5-triazine a yellow dyestuff with similar properties is obtained.

Example 5

66.2 parts of 1-amino-5-phenylmercapto-anthroquinone are stirred for 3 hours at 160° C. in 600 parts by volume of dry nitrobenzene, which contains 1 part of pyridine, with 29.2 parts of 2:4-dichloro-6-(2'-hydroxynaphthyl-1')-1:3:5-triazine, and then for a further ½ hour under reflux. After cooling the mixture, the dyestuff is filtered off. It is reddish yellow and has the formula

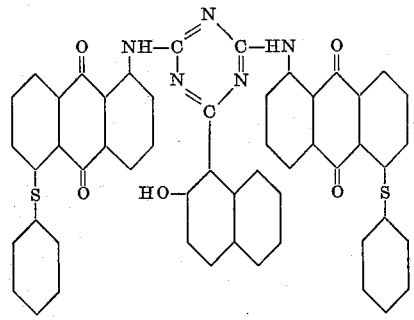

and is then thoroughly washed with methanol and dried at 70° C. in vacuo. The dyestuff dyes cotton from a vat bright yellow tints having very good properties of fastness.

Example 6

6.6 parts of 1-amino-5-phenylmercapto-anthraquinone are stirred under reflux for 2 hours in 50 parts by volume of dry nitrobenzene with 2 parts of terephthalic acid chloride, and 0.2 part by volume of pyridine. The acylation product separates out while the mixture is still hot. After cooling the mixture, the product is filtered off, and washed with a little nitrobenzene and then thoroughly washed with methanol. The brilliant orange dyestuff has the following formula

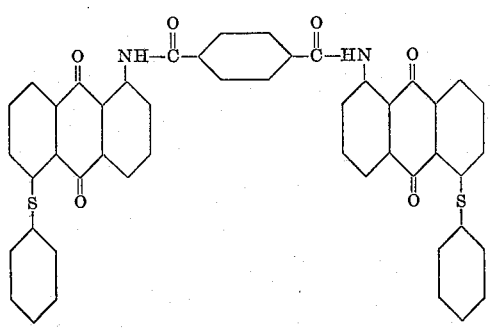

and dyes cotton yellow tints from a yellow-green vat.

Example 7

331 parts of 1-amino-5-phenylmercapto-anthraquinone are stirred in 2000 parts by volume of trichlorobenzene, 5 parts by volume of thionyl chloride and 2 parts by volume of pyridine for 3 hours at 150° C. with 102 parts of isophthalic acid dichloride. After being cooled, the mixture is filtered, and the filter residue is thoroughly washed with methanol and dried in vacuo at 70° C. The dyestuff so obtained corresponds to the formula

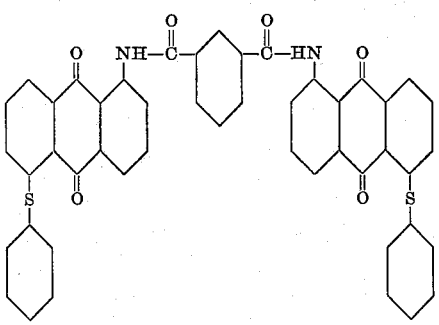

and dyes cotton from a vat yellow tints having excellent properties of fastness to light and wet fastness.

By using, instead of 102 parts of isophthalic acid dichloride, the dicarboxylic acid dichlorides given in Column I in the quantities given in Column II analogous dyestuffs are obtained.

| | Dicarboxylic acid dichloride I | Parts II |
|---|---|---|
| 1 | Cl—CO—⟨⟩—CO—Cl | 102 |
| 2 | O=C(Cl)—⟨naphthalene⟩—CO—Cl | 126 |
| 3 | O=C(Cl)—⟨⟩—⟨⟩—CO—Cl | 140 |
| 4 | O=C(Cl)—⟨⟩—CH₂—⟨⟩—CO—Cl | 147 |
| 5 | O=C(Cl)—⟨⟩—⟨⟩—N=N—⟨⟩—⟨⟩—CO—Cl | 229 |
| 6 | O=C(Cl)—⟨thianthrene⟩—CO—Cl | 170 |

Instead of 331 parts of 1-amino-5-phenylmercaptoanthraquinone, there may be used the anthraquinones named in Column I of the table in Example 1 in the quantities given in Column II.

The acid chloride can first be formed in the same reaction vessel, that is to say, without isolating it, in the manner illustrated in Example 8.

Example 8

34 parts of 2:5-thiophene dicarboxylic acid are stirred with 32 parts by volume of thionyl chloride in 650 parts by volume of dry nitrobenzene in the presence of 0.1 part of pyridine for ½ hour at 120° C. The whole is cooled to 80° C., 132 parts of 1-amino-5-phenylmercaptoanthraquinone are added, and the whole is stirred for 2 hours at 135° C. After cooling the mixture, it is filtered and the yellow-orange dyestuff is washed with methanol.

Example 9

12.6 parts of the dicondensation product of perylene 3:4:9:10-tetracarboxylic acid and 1-aminobenzene-3-carboxylic acid are finely powdered and suspended in 150 parts by volume of dry nitrobenzene, and 12 parts of thionyl chloride and 0.5 part of pyridine are added. The whole is heated while stirring well for 2 hours at 95 to 100° C., then for one hour at 130 to 135° C. and finally for a further ½ hour at 170 to 175° C. The excess of thionyl chloride is distilled off at 120° C. in vacuo, and there are then added to the reaction mixture 16 parts of 1-amino-5-phenylmercaptoanthraquinone. The condensation is carried out for 3 hours at 120 to 125° C., for a further 3 hours at 140 to 145° C., and finally for a further hour at 170° C. After cooling the mixture to room temperature, the dyestuff is filtered off, washed with nitrobenzene and then with methanol, and dried in vacuo at 90° C. There is obtained a red-brown dyestuff powder which dyes cotton and regenerated cellulose from a reddish blue vat by the usual vat dyeing methods scarlet red tints having very good properties of wet fastness. The dyestuff corresponds to the formula

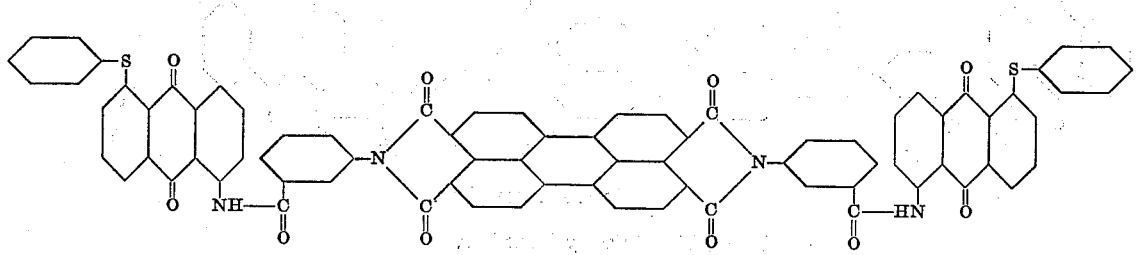

By using, instead of 16 parts of 1-amino-5-phenylmercaptoanthraquinone, 16 parts of 1-amino-4-phenylmercaptoanthraquinone, there is obtained a dyestuff which dyes cotton more bluish red tints.

Example 10

1 part of the dyestuff obtained as described in Example 5 is vatted in 100 parts of water with the addition of 4 parts by volume of a solution of 30% strength of sodium hydroxide and 2 parts of sodium hydrosulfite at 45° C. The stock vat so obtained is mixed with a solution of 4 parts by volume of a solution of 30% strength of sodium hydroxide and 2 parts of sodium hydrosulfite in 2000 parts of water. 100 parts of cotton are dyed in the resulting dyebath for one hour at 40 to 50° C. with the addition of 10 parts of sodium chloride. The cotton is then squeezed, oxidized in the air, rinsed, acidified, again rinsed and soaped at the boil. The cotton is dyed a brilliant yellow tint having very good properties of fastness.

What is claimed is:
1. An anthraquinone dyestuff selected from the group consisting of formulae
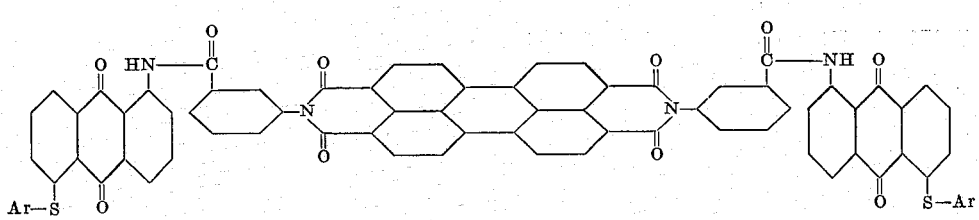
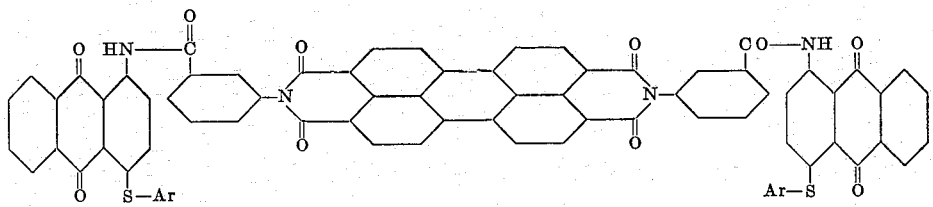
in which Ar represents a phenyl or naphthyl radical.
2. The dyestuff of the formula
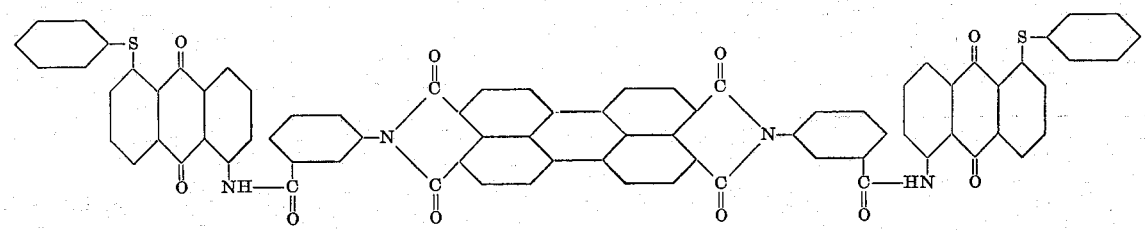
3. The dyestuff of the formula
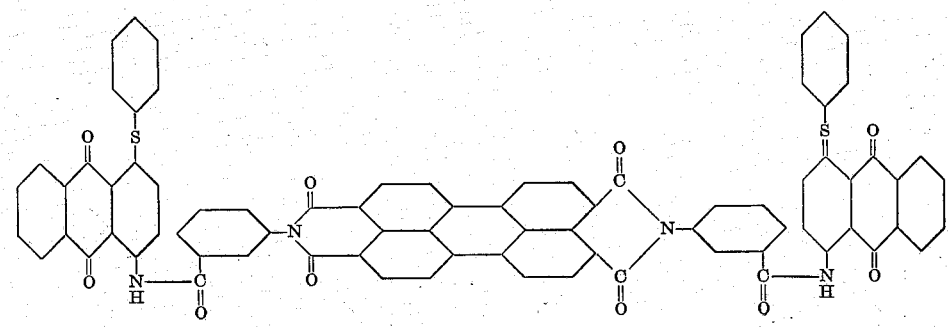
No references cited.
ALEX MAZEL, *Primary Examiner.*
HENRY R. JILES, *Examiner.*
RAY BOYD, *Assistant Examiner.*